United States Patent [19]
Russell et al.

[11] Patent Number: 4,796,670
[45] Date of Patent: Jan. 10, 1989

[54] DRILL PIPE PROTECTOR

[75] Inventors: Larry R. Russell, Houston; Kevin T. Corbett, Missouri City, both of Tex.

[73] Assignee: Exxon Production Research Company, Houston, Tex.

[21] Appl. No.: 109,349

[22] Filed: Oct. 15, 1987

[51] Int. Cl.⁴ .............................................. F16L 57/00
[52] U.S. Cl. .................................... 138/110; 138/108; 138/178; 175/325; 15/104.05
[58] Field of Search ............... 138/103, 108, 110, 109, 138/96 R, 96 T, 145, 146, 137, 140, 172, 174, 177, 178, 147; 384/282; 166/241; 175/325; 15/104.05, 104.09; 51/290, 291, DIG. 30

[56] References Cited

U.S. PATENT DOCUMENTS

| | | | |
|---|---|---|---|
| 3,074,767 | 1/1963 | Von Rosenberg | 175/325 |
| 3,148,004 | 9/1964 | Hall et al. | 175/325 |
| 3,268,274 | 8/1966 | Ortloff et al. | 175/325 |
| 3,294,122 | 12/1966 | Sharp | 138/110 |
| 3,343,890 | 9/1967 | Homer | 308/004 |
| 3,480,094 | 11/1969 | Morris | 175/325 |
| 3,948,294 | 4/1976 | Magarian et al. | 138/141 |
| 3,948,575 | 4/1976 | Rosser | 308/004 |
| 4,043,611 | 8/1977 | Wallace | 175/325 |
| 4,128,972 | 12/1978 | Charvat | 51/298 |
| 4,156,374 | 5/1979 | Shwayder | 175/325 X |
| 4,266,578 | 5/1981 | Swain et al. | 138/110 |
| 4,277,108 | 7/1981 | Wallace | 175/325 |
| 4,349,050 | 9/1982 | Bergstrom et al. | 138/147 |
| 4,602,690 | 7/1986 | Steizer | 175/325 |

OTHER PUBLICATIONS

"Rubber Drillpipe Protectors Reduce Rotary Torque", K. T. Corbett and R. Dawson, SPE Paper No. 15565, 61st Annual Technical Conference and Exhibition of the Society of Petroleum Engineers, New Orleans, La., Oct. 5-8, 1986.

Primary Examiner—James E. Bryant, III
Attorney, Agent, or Firm—Gary D. Lawson; Sheila M. Luck

[57] ABSTRACT

A drill pipe protector which surrounds and embraces a section of drill pipe. The protector includes at least an outer portion and surface made of an elastomeric material in which a quantity of small, hard particles are interspersed. During drilling operations when the protector is placed in sliding contact with the interior surface of casing in a wellbore, the particles exposed on the protectors surface abrade away rust and other protrusions from the inner surface of the casing to rapidly reduce frictional torque and drag experienced in running the drill string. As particles and elastomer are abraded away, additional particles are exposed. In the preferred embodiment the protector is a sleeve consisting of a pair of semi-cylindrical sections, each having an outer elastomeric layer containing approximately 27% by volume and 43% of the combined weight of substantially spherical glass particles sized in the range of 0.15-0.25 millimeters and having a hardness on the MOH scale of approximately 5.5.

14 Claims, 2 Drawing Sheets

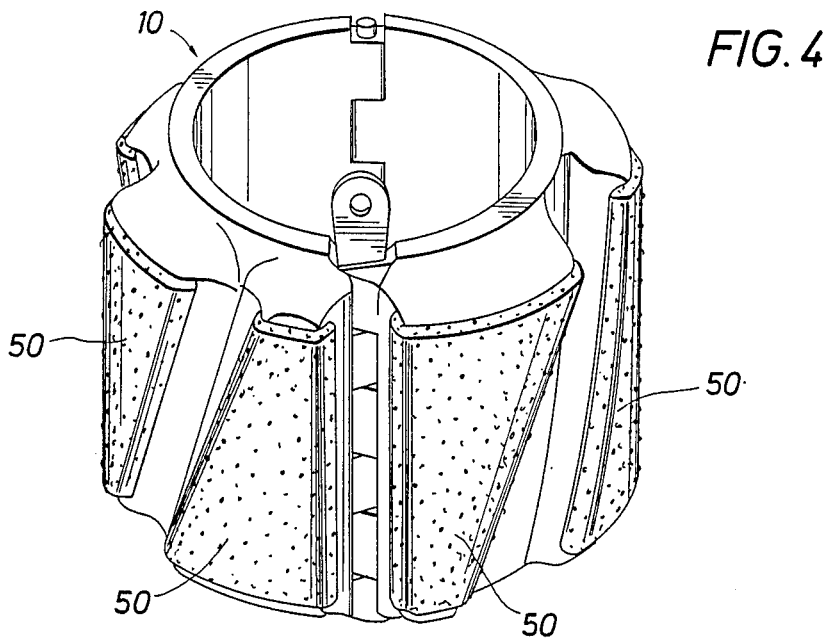
FIG. 4
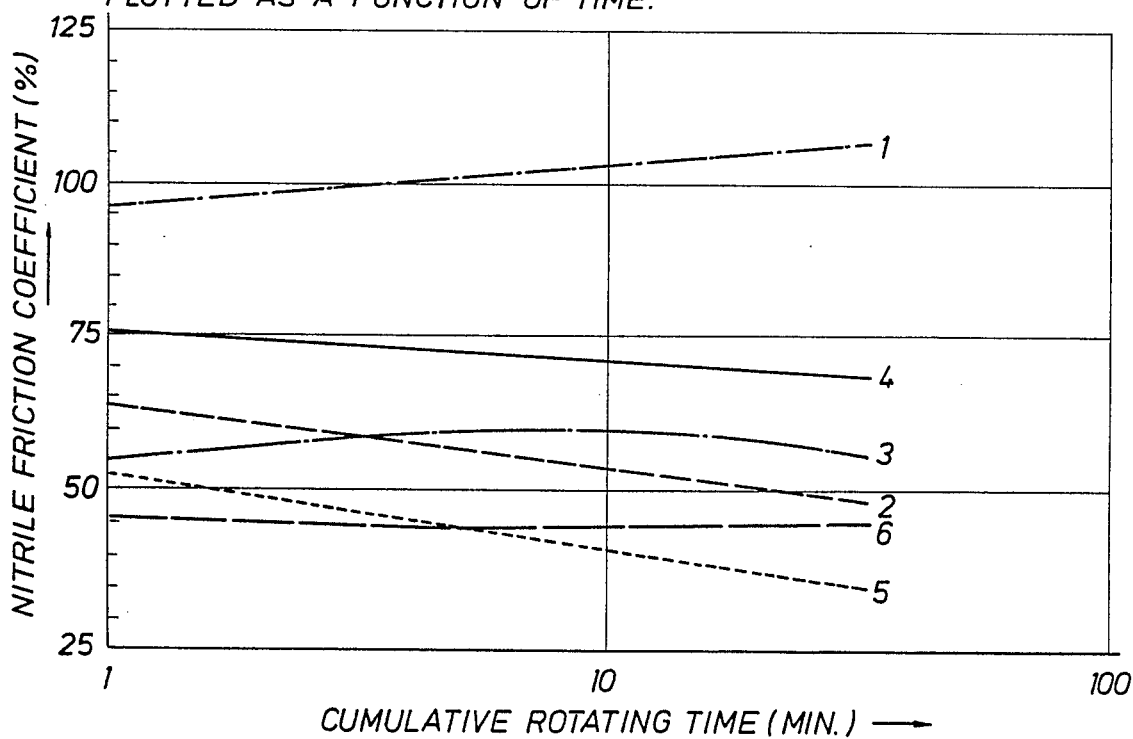
FIG. 5 AVERAGE COEFFICIENT OF FRICTION OF SIX TEST DRILLPIPE PROTECTORS EXPRESSED AS A PERCENTAGE OF THE COEFFICIENT OF FRICTION MEASURED FOR A NITRILE DRILLPIPE PROTECTOR PLOTTED AS A FUNCTION OF TIME.
LEGEND:
1 - NEOPRENE
2 - ETCHED GLASS BEADS
3 - UN-ETCHED GLASS-BEADS
4 - TUNGSTEN CARBIDE
5 - FRAC MATERIAL A
6 - FRAC MATERIAL B

DRILL PIPE PROTECTOR

FIELD OF THE INVENTION

The present invention relates generally to protective devices for oil field tubulars and more specifically to drill pipe protectors.

DESCRIPTION OF THE PRIOR ART

In the drilling of oil and gas wells, drill bits and other equipment are attached to a drill string for boring a hole into the earth. Typically, a drill string may comprise a long string of many connected sections of drill pipe which extend from the earth's surface down into the wellbore or hole being formed by a drill bit connected at the bottom end of the drill string. As the wellbore penetrates more deeply into the earth, it becomes increasingly desirable to install casing in the wellbore, running down from the surface. Casing is placed in the wellbore to prevent the wall of the wellbore from caving in during drilling and to prevent seepage of fluids from the surrounding strata into the wellbore. The casing may also provide a means of extracting petroleum if the well proves productive.

It is a known problem in the oil and gas well drilling industry that during rotary drilling operations drill strings are subjected to shock, abrasion and frictional forces which are exerted on the drill string whenever the drill string comes in contact with the walls of the wellbore or casing. In directional drilling operations and in other instances when the drill string is deviated from the vertical on the order of 5° or more, frictional torque and drag may become great enough to make it difficult or impossible for the well to reach its desired target.

It is known in the art to provide protective devices which can be placed about portions of a drill string in a bracelet-like fashion to maintain the drill string away from the walls of the casing or wellbore. Although early protective devices of this type were of metal, today such protective devices typically are made of rubber or other elastomeric materials. The use of elastomeric material is desirable because of the material's ability to absorb shock. A type of elastomeric drill string protector typically used in the industry is that shown in U.S. Pat. No. 4,266,578 issued to Swain et al on May 12, 1981. Swain teaches a pair of half sleeves of elastomeric material which are connected by a hinge and have a pin mechanism for permitting the hinged sleeve halves to be secured about a drill pipe. Another type of elastomeric drill pipe protector is shown in U.S. Pat. No. 3,480,094 issued to Morris on Nov. 25, 1969. The drill pipe protector in Morris includes a number of ceramic elements which project outward from the elastomeric sleeve to protect the sleeve and the drill string from frictional heat and abrasion when the drill pipe protector contacts any portion of a drill hole or its casing.

The wear protection provided to both casing and drill pipe by pipe protectors is well known in the drilling industry. While the characteristics of the friction developed between elastomeric drill pipe protectors and steel casing has not received wide attention, it was generally believed that elastomeric drill pipe protectors could in some circumstances result in significant increases in the rotary torque required for drilling operations. Such high torque values are frequently experienced in field operations during the initial run of drill pipe into the casing, which generally has an unpolished, rusty and often scaly interior surface. Recent laboratory tests have indicated that such high torque values can be reduced by polishing the rough interior surface of the casing. (See "Rubber Drillpipe Protectors Reduce Rotary Torque", K. T. Corbett and R. Dawson, SPE Paper No. 15565, presented at 61st Annual Technical Conference and Exhibition of the Society of Petroleum Engineers, New Orleans, La., Oct. 5-8, 1986). A polished casing decreases the friction between the drill pipe protector and casing because a thin layer of liquid is able to form between the protector and casing. The compliance of the rubber in the drill pipe protector allows the lubricating film to exist even if the casing surface is somewhat rough.

It would be desirable to develop a drill pipe protector capable of providing the necessary wear protection of the casing and the drill pipe while polishing the interior surface of the casing to reduce the initial rotary torque required for drilling operations and while allowing a thin lubricating liquid film to form between the drill pipe protector and the casing to maintain the reduced rotary torque once the casing is polished.

SUMMARY OF THE INVENTION

The invention is a drill pipe protector which reduces the frictional forces initially developed when a drill string slidingly contacts casing secured within a wellbore during drilling operations by polishing the interior surface of the casing and allowing a thin lubricating film to form between the drill pipe protector and the casing to maintain the reduced rotary torque. The preferred embodiment of the apparatus of the invention is a drill pipe protector which is a cylindrical sleeve adapted to embrace and be secured to a portion of drill pipe. The sleeve has an outer layer and exterior surface of an elastomeric material with small, hard particles interspersed therein.

Such particles, being in and near the elastomeric outer surface of a drill pipe protector, greatly accelerate the rate of cleaning and polishing of the interior surface of steel casing which is in sliding contact with the invention during drilling operations with little or no increase in the rate of casing wear. Acceleration of the rate of cleaning and polishing achieves a desirably lower coefficient of friction between the protector and casing much more quickly than with state-of-the-art pipe protectors. This results in a rapid reduction in the torque and drag loads experienced during drilling operations. Another advantage offered by the use of the present invention is extended service life of the drill pipe protector itself resulting from reduced wear and damage to the elastomeric base material.

DESCRIPTION OF THE DRAWINGS

FIG. 4 is an perspective view of the configuration of a test specimen used to evaluate the invention.

FIG. 5 is a graph of the test results showing the reduction in friction coefficient of drill pipe protectors made according to the present invention relative to a drill pipe protector having no particles interspersed in its outer elastomeric layer and surface.

DETAILED DESCRIPTION OF THE PREFERRED EMBODIMENT

Figure 1:
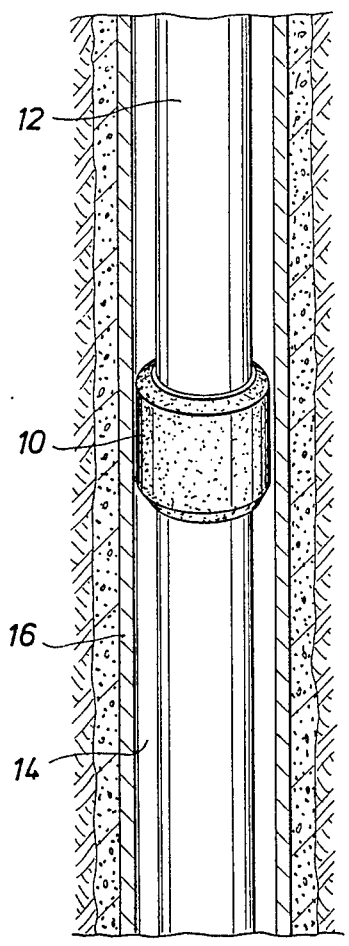
FIG. 1 is a partial cross-sectional view illustrating a section of drill pipe to which a drill pipe protector in accordance with the present invention is attached, the drill pipe being in a wellbore lined with casing.

Referring to FIG. 1, drill pipe protector 10 in accordance with the present invention is shown attached to drill pipe 12 inside wellbore 14 lined with casing 16.

Figure 2:
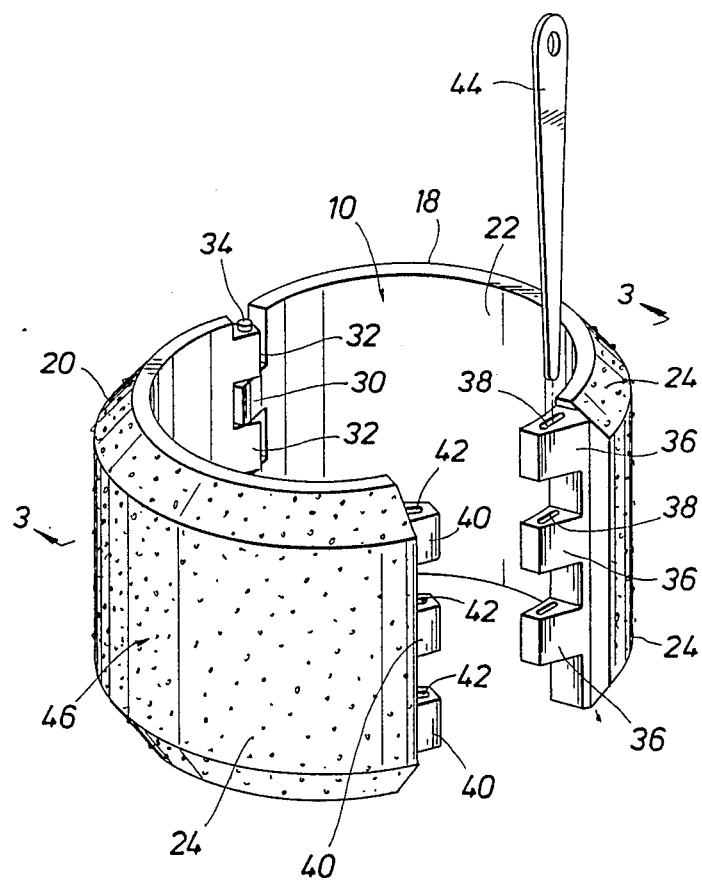
FIG. 2 is an perspective view of a preferred embodiment of the invention.
Figure 3:
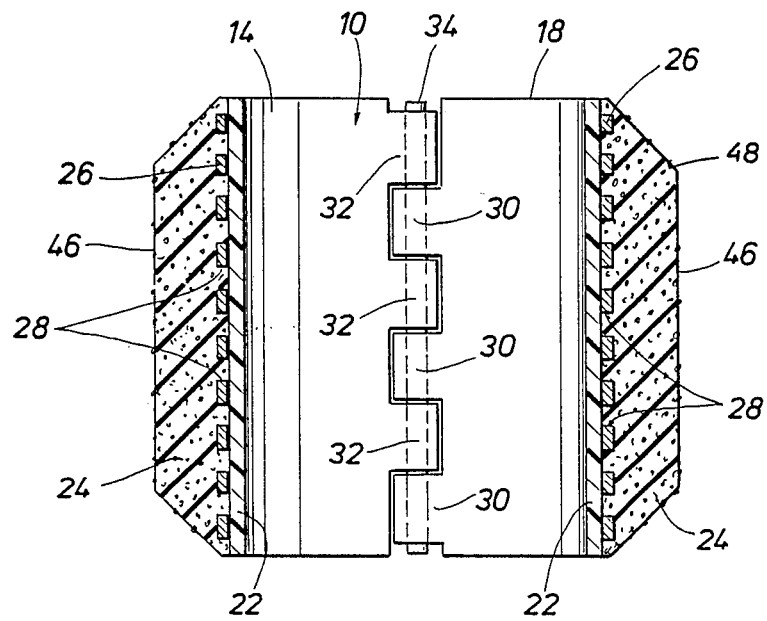
FIG. 3 is an elevational cross section of the preferred embodiment of the invention.

The preferred embodiment of the invention is shown in FIGS. 2 and 3. Referring to FIGS. 2 and 3, there is shown drill pipe protector 10 formed of two half sections 18 and 20, each of which is semi-cylindrical in shape. Although a single elastomeric layer may work, in a preferred embodiment, each of sections 18 and 20 has inner elastomeric layer 22 and outer elastomeric layer 24. The width of layers 22 and 24 is not critical to the invention. Metallic support section 26 supports inner layer 22 and outer layer 24. Through perforations 28 in metallic support section 26, inner layer 22 is bonded, for example by vulcanization, to outer layer 24. Each of sections 18 and 20 has means along one edge parallel to the axis of the section whereby sections 18 and 20 may be movably connected together. In the preferred embodiment, each edge is toothed, that is one edge of section 18 has hinge projections 30 with borehole passages therethrough (not shown) which interlace with hinge projections 32 from section 20 having borehole passages therethrough (not shown) to form a hinge. Projections 30 and 32 are interlaceable. When interlaced, pin 34 is passed through the borehole passages to serve as the pivot of the hinge. Each of sections 18 and 20 has along its other edge, parallel to the axis of the section, means for securing sections 18 and 20 about drill pipe 12. In the preferred embodiment the means for securing sections 18 and 20 about drill pipe 12 include fastener projections 36 with borehole passages 38 therein formed along the other edge of section 18 and fastener projections 40 with borehole passages 42 therein formed along the other edge of section 20. Fastener projections 36 and 40 are interlaceable and when interlaced, borehole passages 38 and 42 form a tapered hole to receive a tapered pin 44 which when driven through the borehole passages 38 and 42 draws sections 18 and 20 tightly together to form a cylinder.

Outer layer 24, including its outer surface 46, is generally formed of an elastomeric material. The composition of the elastomeric material is such that after a suitable quantity of particles 48 are added, the elastomer will have desirable molding and compounding properties. Any rubber or elastomeric material which can be readily compounded and molded after the introduction of a quantity of hard particles 48 of composition and size as later described herein, and which has chemical and mechanical characteristics suitable for use in a wellbore environment, is acceptable. Preferably the selected elastomer with particles 48 interspersed therein may be injection molded to form protector 10. Nitrile, because it is the elastomer from which many drill pipe protectors used by the industry today are made, is preferred. Other suitable elastomers include neoprene and ethylene/propylene rubber, generally referred to as EPDM (ethylene-propylene diene methylene).

Interspersed in outer layer 24 is a quantity of small, hard particles as discussed below. As used herein, "interspersed in an outer layer" means that some particles are located in and attached to the outer surface of the outer layer and others are located in a region that is adjacent to the outer surface and extends radially inward from the outer surface. Particles 48 interspersed in outer layer 24 are selected and interspersed in the elastomeric material in such a manner that when outer surface 46 of outer layer 24 is placed in sliding contact with the interior surface of casing 16 in the presence of drilling mud, particles 48 which are exposed on the outer surface 46 will protrude a sufficient distance from outer surface 46 to contact rust, scale and other protrusions from the interior surface of casing 16. The resulting aggressive characteristic of outer surface 46 with particles 48 will be sufficient to remove such protrusions from the surface of casing 16.

The shape of particles 48 interspersed in outer layer 24 is not believed to be critical; they may be spherical, rounded, irregular, subangular or angular. However, it is believed that the exposed surfaces of particles 48 on outer surface 22 should be subangular, that is, have a negative rake angle with respect to the interior surface of casing 16. Subangular, including rounded, particles 48 are desirable because they impart high loads to rust projections, leading to rapid fracturing of brittle rust layers. Subangular particles 48 will burnish over high spots in casing 16, leading to a reduction in surface roughness. Also the degree of scoring of the interior surface of casing 16 is minimized through the use of rounded or subangular particles.

As to chemical composition and hardness of particles 48, any material known to have abrasive strength characteristics which are suitable for cleaning and polishing steel or other casing metal alloys and whose composition makes it suitable for bonding or compounding with elastomeric materials is acceptable. Suitable compositions of such materials are well known in the abrasion and polishing arts. They include sand, glass, ceramics (such as sintered bauxite), oxides (such as aluminum oxide and silicon dioxide), carbides (such as silicon carbide and tungsten carbide), metals (such as chromium, nickel, or hardened steel), and combinations of particles including any of the above materials. The hardness of particles 48 preferably should equal or exceed that of the metal from which casing 16 is made and preferably be in the range of 5 to 9 on the MOH scale of hardness.

Particles 48 should be sized so that while particles 48 remain fixed to the outer elastomeric surface of drill pipe protector 10, their radially outward projected exposed surfaces will contact and abrade rust and scale from the inner surface of well bore casing 16 without scraping casing 16. For example, if particles 48 are too large, they may protrude excessively from the outer elastomeric surface of protector 10 and extend through the lubricating film, causing an increase in friction. The size of particles 48 should be such that particles 48 can be passed through a U.S. standard sieve size #6 (as defined by ASTM standard E11-70). The preferred size of particles are those which, using ordinary sieving techniques, can pass through a U.S. standard sieve #6 but not through a U.S. standard sieve #270. By means of such a grading process, the usual dimension of particles 48 falls within the range of 0.05 to 3.0 millimeters.

The quantity of particles 48 should be enough to polish the interior surface of casing 16 to remove rust and other surface protrusions, but not enough to interfere with the protective purpose of drill pipe protector 10. In a preferred embodiment the quantity of particles 48 will range from 8-30% by volume. Although fewer particles 48 than 8% by volume may improve the abrasive quality of the elastomeric material over that of an elastomeric material having no particles 48, they usually do not add a sufficient abrasive quality to polish the casing surface. An amount of particles 48 greater than 30% by volume may reduce the bonding ability of the elastomeric material or ultimately increase the frictional forces by continually abrading the surface of casing 16 beyond the level of polishing.

A preferred embodiment of the invention contains particles 48 which are glass beads, whose surfaces have been etched by treating the beads in a hydrofluoric acid solution. The etched glass beads are substantially spherical, have a hardness on the MOH scale of hardness of approximately 5.5, and have sizes which fall within the range of 0.15 to 0.25 millimeters. The quantity used represents approximately 43% of the combined weight and 27% of the combined volume of etched glass beads and nitrile, the preferred elastomer.

In operation, drill pipe protector 10 is affixed to a section of drill pipe 12 in an embracing fashion by driving tapered pin 44 through borehole passages 38 and 42. As drill pipe 12 is run into wellbore 14 and rotated, the outer surface 46 of drill pipe protector 10 will come into sliding contact with the interior surface of casing 16. Initially, particles 48, which are exposed on and thereby protrude from the outer surface 46 of protector 10, and the elastomeric material of outer surface 46 of protector 10, knock off the rust, scale and other protrusions on the interior surface of the casing. During the process, some of particles 48 initially exposed will be removed from the outer surface 46 and some of the elastomer of outer surface 46 will be abraded away. As this initial abrasion of rust and protrusions on casing 16 occurs, additional particles 48 interspersed in outer layer 24 of protector 10 will become exposed on and protrude from outer surface 46 of the drill pipe protector 10 due to the sacrificial abrasion of elastomeric material. In this manner, embedded particles in outer layer 24 are made available at the outer surface 46 continuously for contacting and accelerating the removal of any remaining rust, scale and protrusions from the interior surface of casing 16. Through this process, the more protrusive rust and scale are rapidly removed from the interior surface of casing 16 and the base metal of the surface is polished and burnished. The observable effect to the human eye is that the interior surface of casing 16 which has been in sliding contact with the pipe protector 10 begins to appear cleaned and smoothed.

Two laboratory test programs were conducted to demonstrate and evaluate the invention. The test set-ups used a motor driven shaft, about which a drill pipe protector test specimen was installed. The drill pipe protector specimen was immersed in drilling mud as described below and the interior surface of a cylindrical length of casing was pressed against the specimen. The shaft speed and the force exerted by the casing against the test specimen were controlled. Sensors measured the torque required to rotate the shaft and other parameters of interest.

In the first set of tests, six drill pipe protector test specimens were prepared and tested. Each of the six test specimens were made from a commercially available drill pipe protector with a 5 inch (12.7 cm) inner diameter and 7½ inch (19.05 cm) outer diameter, part number DP-5075F, manufactured by Regal International, Inc., Houston, Tex. As shown in FIG. 4, the exterior surfaces of the fluted ribs of each protector were machined and patches 50, sized to replace the material machined away, were bonded to the base material of the fluted ribs. The outer portion of the commercially available protectors selected for making the test specimens was of nitrile. The base material of each patch 50 was a neoprene compound with a specific gravity of approximately 2.5, type CMPD #193, available from Eutsler Technical Products, Inc., Houston, Tex. Neoprene was chosen over nitrile as the patch base material because of neoprene's relative ease of handling during compounding and molding.

One test drill pipe protector was prepared using patches made of neoprene to which no particles were added. For preparing the other five protectors, patches 50 for each were made using a compound of neoprene to which a quantity of particles of one of five different compositions was added. The five types of particle compositions used were: etched glass beads, un-etched glass beads, tungsten carbide and two different types of commercially available proppants frequently used in the oil and gas industry in performing formation fracturing operations. One of these proppants, referred to herein as Proppant A, was comprised by volume of approximately 49% $Al_2O_3$ and 47% $SiO_2$. A proppant of this type is available from the Standard Oil Products Company, Dallas, Tex., under the Product name "Carbo-Lite TM". The second proppant, referred to herein as Proppant B, was composed by volume of approximately 65-75% Mullite ($Al_6Si_{12}O_{13}$) and 15-25% Aluminum Oxide ($Al_2O_3$). A proppant of this type is available from Norton-Alcoa Proppants, Ft. Smith, Ark., under the product name "Interprop TM Plus". Tungsten carbide is generally considered to be in the class of fine angular abrasives and has a hardness on the MOH scale of approximately 9.0. The glass beads used were substantially spherical, clear glass beads having a specific gravity in the range of 2.45-2.50, substantially no free silicon content, less than 1% free iron content and a hardness on the MOH scale of hardness of approximately 5.5. Glass beads of this type are available from Potter Industries Inc., Hasbranch Heights, N.J. The glass beads used for some of the rubber blends were "etched" to increase the roughness of their surfaces by washing the beads in a hydrofluoric acid solution.

The size range, quantity in grams, and percent by volume of each of the five particles used to prepare the five test drill pipe protectors is shown in Table 1. In each instance the quantity of particles shown was mixed with two pounds (910 grams) of neoprene to form an elastomeric compound with interspersed particles from which the patches were made, except for the etched glass beads specimen, where three pounds (1.36 kg) of neoprene was used.

TABLE 1

| Quantity and Size Range of Particles Used in Preparing Test Specimens | | | |
|---|---|---|---|
| Composition | Size Range (mm) | Weight (grams) | % by Volume |
| Etched Glass Beads | 0.250–0.150 | 725 | 21% |
| Un-Etched Glass Beads | 0.250–0.150 | 725 | 29% |
| Tungsten Carbide | 0.125–0.090 | 910 | 8% |
| Proppant A | 0.840–0.420 | 775 | 28% |
| Proppant B | 0.840–0.420 | 560 | 22% |

All tests were run with a length of test casing immersed in 12-ppg (1440 kg/m³) water-base mud to which 0.5% sand (Clemtex #5, 80–120 mesh, available from Clemtex, Inc., Houston, Tex.) had been added to simulate abrasive drilling solids of the type which might be encountered during field drilling operations. The lengths of test casing were of N-80 steel, of the type commonly used in actual drilling operations, which had been stored outdoors for an extended period of time. The casing interior surfaces were rusty, and to some extent scaly, but no effort was made to quantify the roughness.

Each of the six protector test specimens was run through the same test program. The test procedure consisted of two testing phases: a "break-in" phase followed by a "multi-load" phase. The break-in phase began with a fresh protector test specimen and a fresh sample of rusty casing immersed in water-base mud with sand. During this phase the protector test-specimen was rotated for ten minutes at 75 rpm under a 1,000 pound (4450 newton) side load against the casing, and for 20 minutes at 75 rpm under a 2,000 pound (8900 newton) side load. Thereafter, multi-load tests were performed on the specimen. The multi-load tests consisted of rotating the specimen at 15, 75 and 125 rpm at side loads of 500, 1,000, 2,000 and 3,000 pounds (2225, 4450, 8900 and 13,350 newtons respectively) for a time period under each side load sufficient to measure the torque required to rotate the specimen at the selected speed. Thereafter, each specimen was run for one hour at 75 rpm under a 2,000 pound (8900 newton) side load to further polish the interior surface of the casing. Then the multi-load tests were repeated. For comparison purposes, a standard unmodified protector was run in the same manner as that used for each of the six test specimens.

The results of these tests are plotted in FIG. 5. FIG. 5 shows the average coefficient of friction measured for each modified protector test specimen expressed as a percentage of the coefficient of friction measured for the unmodified (nitrile compound) protector, plotted as a function of time after initial contact with unpolished casing. These data indicate that the base case test specimen (nitrile base material with plain neoprene patches) shows little change compared to the off-the-shelf, unmodified (nitrile only) protector. However, the specimens with neoprene patches with particles interspersed therein showed friction coefficients ranging from 35% to 75% of the friction coefficient of an unmodified (nitrile only) protector. The specimens showing the greatest reductions in friction coefficient were specimens 5 and 6 (Proppants A and B) and specimen 2 (etched glass beads). The least reduction in friction coefficient was shown in specimen 4 (tungsten carbide particles).

The second set of tests was run in substantially the same manner as the first set, using thirteen test specimens. The tests concentrated primarily on the use of glass beads interspersed within neoprene and were designed to compare the different results caused by the use of different sizes and different quantities of beads in the drill pipe protectors. The tests indicated that the optimum size and quantity of glass beads is between 0.15–0.25 millimeters with the beads comprising 43% of the combined weight of beads and neoprene and 27% by volume, which resulted in a relative friction of 46% as compared to 78% for a neoprene sample with no beads interspersed within the sample. When the percent of glass beads by weight was decreased, the relative friction increased. Increasing the size of glass beads generally had a minimal effect on the relative friction except when, as a result of the increased size, the percent by weight had to be reduced in order for the neoprene to hold the beads. For example, when glass beads between 2.00 to 3.00 millimeters in size were used, the percent by weight of glass beads had to be reduced to 11% or 6% by volume. This resulted in a relative friction of 73%, only a 5% difference from the plain neoprene sample.

It is to be understood that the particular selections of types and quantities of particles and elastomeric material discussed herein are representative only. Similarly the particular shape and design of drill pipe protector 10 illustrated in FIGS. 2 and 3 is representative of but one embodiment which can be made in accordance with the present invention. There may be substituted for those discussed, various compositions and quantities of small, abrasive particles 48 having the characteristics necessary to permit them to be included in a mixture with an elastomeric material which mixture will remain suitably moldable and useful for making drill pipe protector 10 with particles 48 interspersed in outer layer 24 within the scope of the invention. Also, drill pipe protector 10 may be constructed in different shapes and sizes to meet particular drilling operation requirements.

The preferred embodiment of the present invention and method of using it have been detailed above. It should be understood that the foregoing description is intended only to be illustrative, and that numerous other embodiments of the present invention can be developed without departing from the full scope of the invention set forth in the appended claims.

What we claim is:

1. In a casing having a drill pipe element and a drill pipe protector disposed in said casing, protector comprising:
    a support element adapted to be affixed to the outer surface of said drill pipe element; and
    an elastomeric bearing element secured to said support element, said bearing element extending radially outward from said support element to define a radially outer contact surface of said drill pipe protector, said outer contact surface, at least a radially outermost portion of said bearing element and the remainder of said elastomeric bearing element being configured of an elastomeric material having a quantity of abrasive particles interspersed throughout said particles having a hardness of the MOH scale of hardness of at least 5, said particles having a size in the range of 0.05 to 3.0 millimeters, said particles making up between 8% to about 30% of the combined volume of said particles and said elastomeric material, some of said particles protruding from said outer contact surface, said particles being configured and arranged in such elastomeric material to provide a means to continually abrade and polish the interior surface of said casing and therby decrease torque and drag loads therebetween.

2. The drill pipe protector of claim 1 wherein said bearing element is annular.

3. The drill pipe protector of claim 2 wherein there are a plurality of bearing elements, said bearing elements being arranged in an annular array about said support element.

4. The drill pipe protector of claim 1 wherein some of said particles protrude from the outer contact surface of said bearing element.

5. The drill pipe protector of claim 1 wherein the particles are substantially spherical.

6. The drill pipe protector of claim 1 wherein the particles are substantially comprised of $Al_2O_3$.

7. The drill pipe protector of claim 1 wherein the particles are substantially comprised of $SiO_2$.

8. The drill pipe protector of claim 1 wherein the particles are substantially comprised of glass.

9. The drill pipe protector of claim 8 wherein the particles have a size range of 0.15–0.25 millimeters and make up approximately 27% of the combined volume of said particles and said elastomeric material.

10. The drill pipe protector of claim 1 wherein the particles are substantially comprised of sintered bauxite.

11. The drill pipe protector of claim 1 wherein the particles are substantially comprised of tungsten carbide.

12. The drill pipe protector of claim 1 wherein the particles are substantially comprised of ceramic.

13. The drill pipe protector of claim 1 wherein the particles are substantially comprised of silicon carbide.

14. The drill pipe protector of claim 1 wherein said protector consists of a pair of cylindrical half sections.

* * * * *

UNITED STATES PATENT AND TRADEMARK OFFICE
CERTIFICATE OF CORRECTION

PATENT NO. : 4,796,670

DATED : January 10, 1989

INVENTOR(S) : Larry R. Russell and Kevin T. Corbett

It is certified that error appears in the above-identified patent and that said Letters Patent is hereby corrected as shown below:

In column 8, line 58, change "2" to --1--.

Signed and Sealed this

Twenty-seventh Day of June, 1989

Attest:

DONALD J. QUIGG

Attesting Officer

Commissioner of Patents and Trademarks